Jan. 3, 1950     A. WANDYAK     2,493,328
PORTABLE SOLARIUM

Filed July 23, 1946     2 Sheets-Sheet 1

INVENTOR.
ANTHONY WANDYAK

BY *Victor J. Evans & Co.*
ATTORNEYS

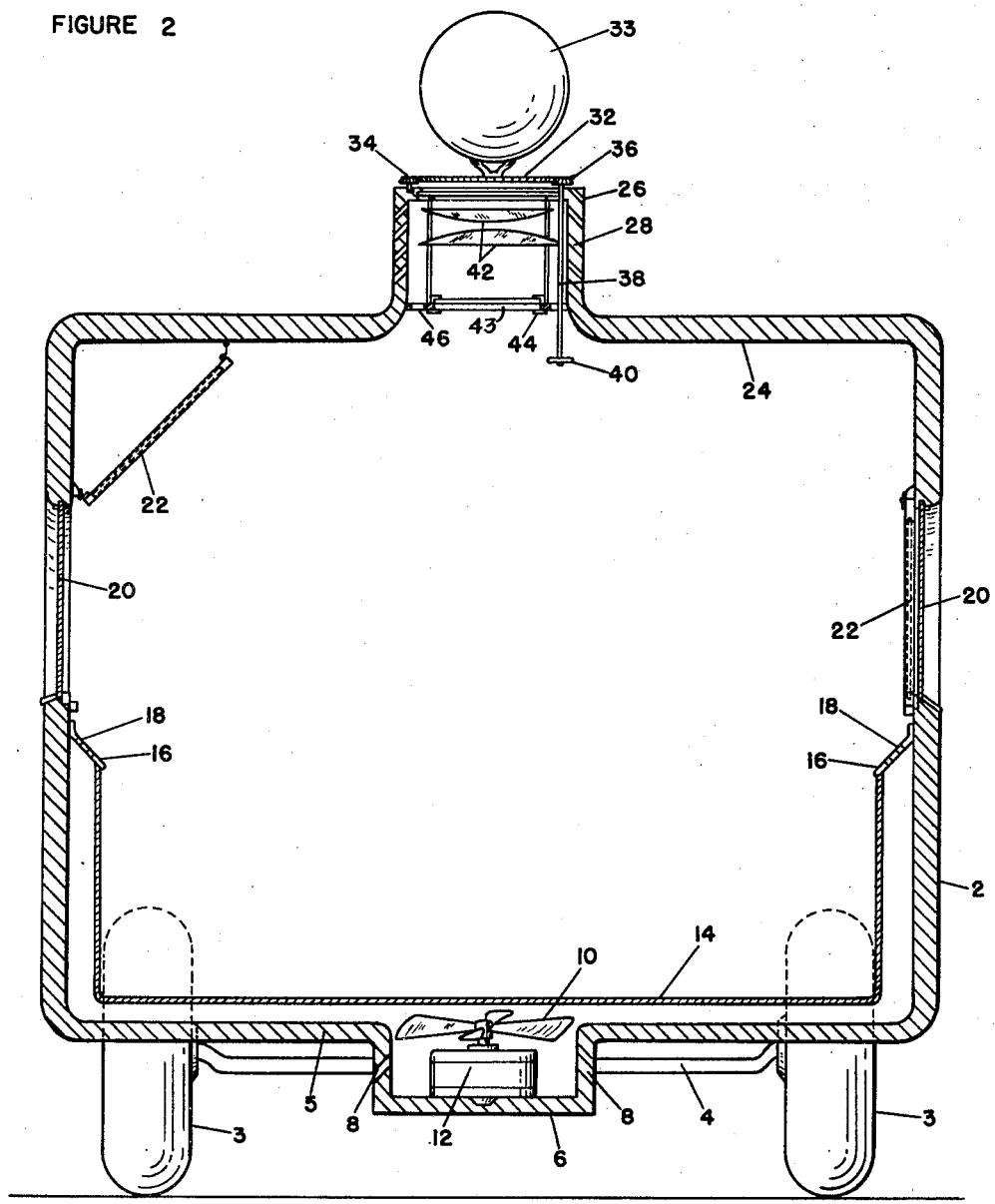

Patented Jan. 3, 1950

2,493,328

UNITED STATES PATENT OFFICE 2,493,328

PORTABLE SOLARIUM

Anthony Wandyak, Ballston Spa, N. Y.

Application July 23, 1946, Serial No. 685,755

1 Claim. (Cl. 128—372)

My present invention relates to an improved portable solarium and more particularly to the type of portable solarium especially adapted for sun bathing quarters wherein I have combined in a unique arrangement, various elements for directing and controlling the sun's rays within the trailer, and I have also provided ventilating means for the trailer so that the person or persons receiving the benefit of the sun's rays may do so in comfort.

In the accompanying drawings I have illustrated one complete example of the physical embodiment of my invention according to the best mode I have thus far devised, but it will be understood that various changes and alterations may be made in the exemplified structure within the scope of the appended claim.

In the drawings:

Figure 2 is a transverse vertical sectional view thereof.

Figure 1:
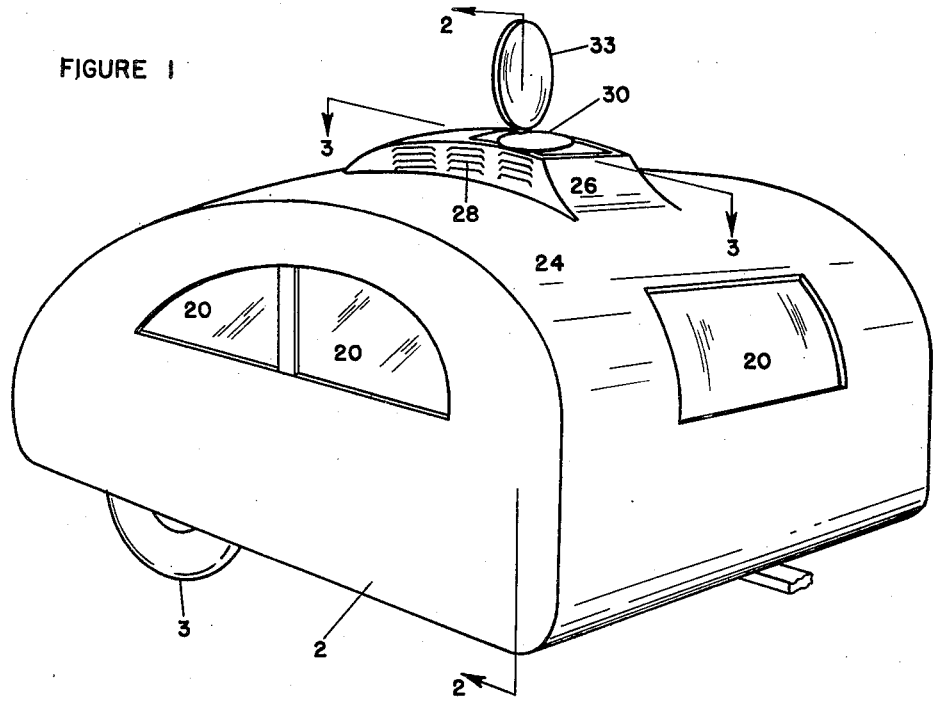
Figure 1 is a perspective view of the portable solarium of my invention.
Figure 3:
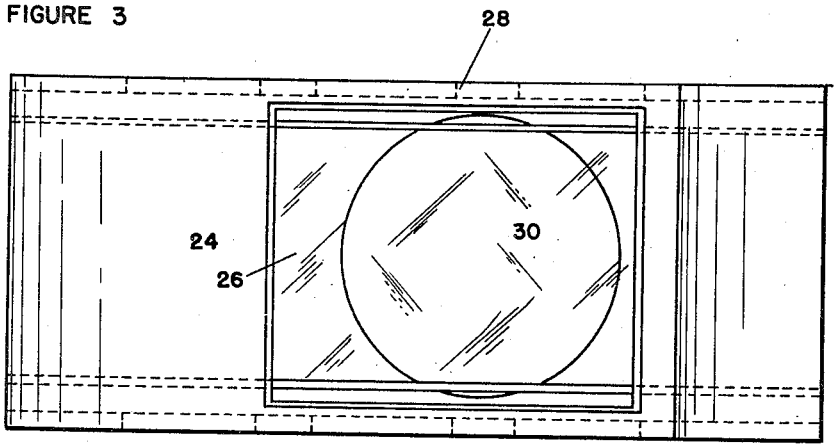
Figure 3 is a top plan view of the portable solarium.
Figure 4:
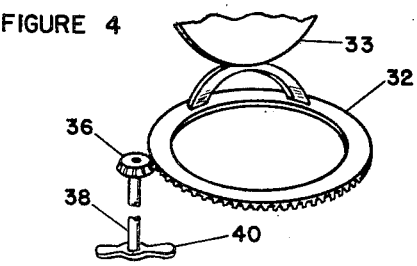
Figure 4 is a detail view of the adjusting means for the reflector atop the portable solarium.

Referring now to the drawings, I have illustrated the portable solarium of my invention as embodied in the body comprising the walls 2 having running wheels 3 mounted upon the axle 4.

The body is formed with a bottom 5 in which I have fashioned a housing 6 having openings 8 therein to the outside so that the fan 10 driven by motor 12 may draw in air from the outside. The air thus drawn will pass between the walls 2 and the inner spaced walls 14, and the covers 16 are formed with air vents 18 through which the fresh air passes to enter the body of the trailer.

The body of the trailer is also fashioned with windows having fixed transparent closures 20 and the hinged transparent closures 22 forming a double seal for the windows.

The top 24 of the trailer is formed with a housing 26 provided with louvres 28 and the upper edge of the housing is fashioned with a transparent cover 30. A reflector base 32 comprising an open toothed ring carries the reflector 33 thereon and this base rests upon an idler gear 34 and a driven gear 36 having a shaft 38 and handle 40 within the body of the trailer.

Spaced below the transparent cover 30 and within the housing I have located a condensing lens 42 and a diffusing lens 43 in the frame 44 which is formed with openings 46 so that the air circulating within the body may pass through the frame and the housing 26 to the louvres 28.

The reflector 33 mounted on the ring 32 is rotatable about the periphery of the housing and is designed to reflect the rays of the sun through the cover 30 and through the lenses 42 and 43 directly upon the person bathing in the trailer. The reflector is movable so as to take advantage of the sun when in its various positions and the rays of the sun will be directed through the lenses regardless of the position of the sun above the horizon when the reflector is properly adjusted.

The inner surfaces of the walls 2 of the body may be provided with highly polished surfaces such as stainless steel in order that all advantage may be taken of the reflected rays of the sun.

If desired suitable screens or filters may be used in conjunction with the lenses to remove undesired rays of the sun, and it is believed apparent that the trailer of my invention will provide a comfortable and pleasant place to sun bathe and with the ventilating fan and circulating means excessive heat will be eliminated.

Having thus fully described my invention what I claim as new and desire to secure by Letters Patent is:

A portable solarium adapted to gather and direct the rays of the sun downwardly to a person sun bathing within, said portable solarium including a body, ventilating means including a power driven fan for circulating air through said body, said body being formed with a housing on the top thereof, a transparent cover for said housing, a reflector for directing the rays of the sun downwardly through said body, said reflector comprising a vertically disposed disk, a base for said reflector including a ring rotatably mounted in said housing, means for rotating said ring in order that said reflector may follow the sun and ray condensing and diffusing lenses in the housing below said cover whereby the rays of the sun are condensed and diffused on a person sun bathing within.

ANTHONY WANDYAK.

REFERENCES CITED

The following references are of record in the file of this patent:

UNITED STATES PATENTS

| Number | Name | Date |
| --- | --- | --- |
| 250,672 | McIntosh | Dec. 13, 1881 |
| 507,999 | Davis | Nov. 7, 1893 |
| 668,404 | Hanneborg | Feb. 19, 1901 |
| 1,780,363 | Proctor | Nov. 4, 1930 |
| 2,183,111 | Tesmer | Dec. 12, 1939 |